Patented May 22, 1951

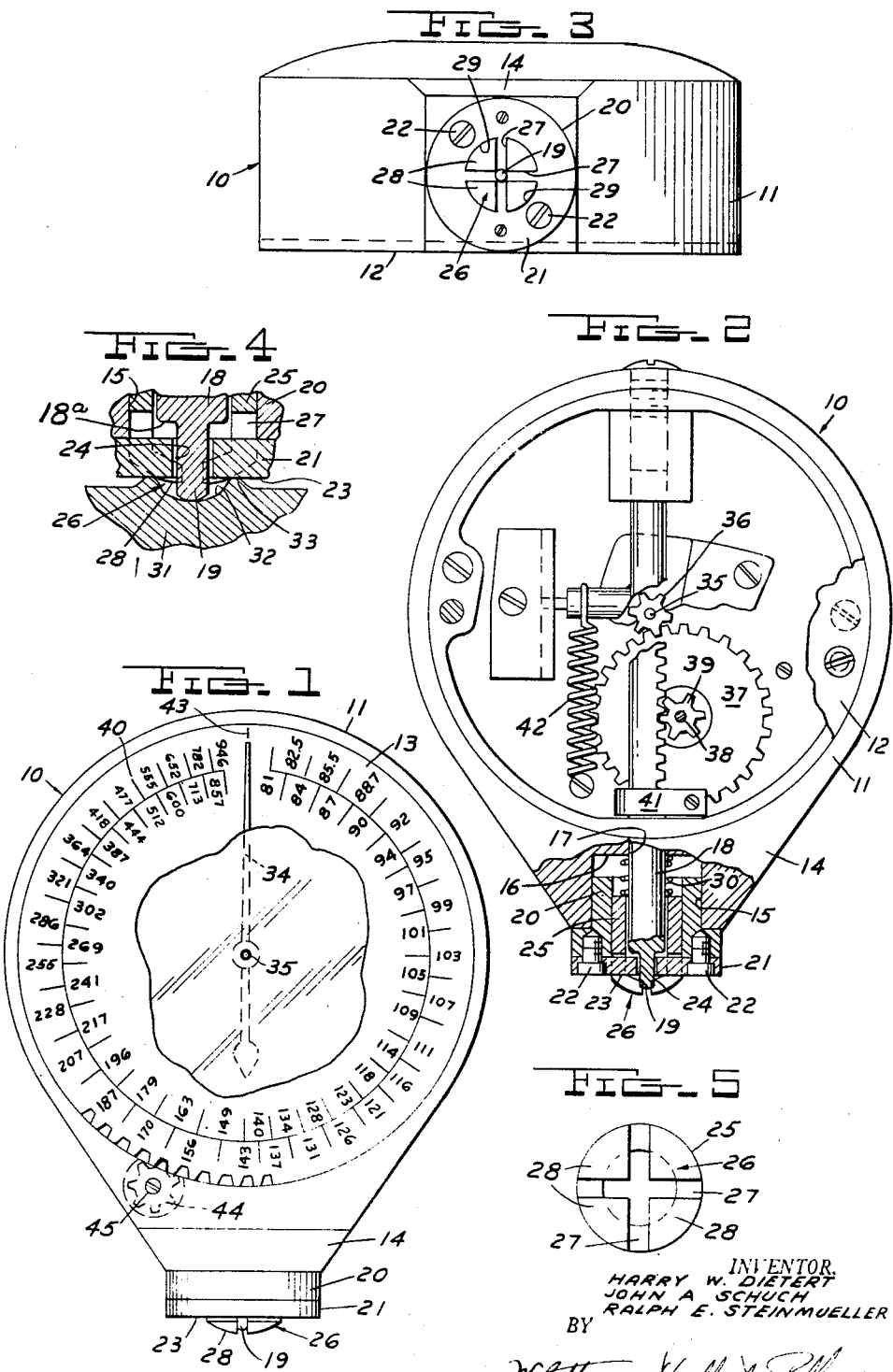

2,553,755

UNITED STATES PATENT OFFICE 2,553,755

DEPTH INDICATOR AND HARDNESS TESTING DEVICE

Harry W. Dietert, John A. Schuch, and Ralph E. Steinmueller, Detroit, Mich., assignors to Harry W. Dietert Company, Detroit, Mich., a corporation of Michigan Application March 28, 1949, Serial No. 83,851

3 Claims. (Cl. 33—172)

This invention relates generally to indicators and refers more particularly to improvements in indicators of the type employed to measure the hardness characteristics of materials.

One method of determining the hardness of materials is commonly known to the trade as the Brinell test. This test consists in applying a known load to a surface of a specimen through the medium of a hardened steel ball of known diameter. The depth of the resulting impression or indentation formed in the specimen by the ball is then meaured preferably by employing an indicator of the general type noted in the Harry W. Dietert et al. application Serial No. 43,257, filed August 9, 1948. The indicator shown in this application renders it possible to measure the depth of the depression or indentation in terms of the Brinell hardness numbers, and thereby eliminates the necessity of referring to conversion tables or making time consuming calculations.

As a result of forming a depression in a specimen with a hard ball to determine the hardness characteristic of the specimen the material bordering the depression is frequently upset and forms a slightly raised rim portion around the depression. In order to obtain an accurate indication of the hardness of the specimen it is desired to add the height of any rim surrounding the depression to the depth of the latter and it is an object of this invention to provide an indicator which not only accomplishes this result but, in addition, is equipped with means enabling the hardness number corresponding to the depth of the depression in the specimen plus the height of any rim present to be read directly from a scale on the indicator.

It is another object of this invention to provide the indicator with a rest plate having a flat bearing surface engageable with the surface of the specimen immediately surrounding the depression previously formed by the hardened ball and having an opening through which the outer end of the indicator operating stem projects. The outer end of the stem is adapted to engage the bottom of the depression and is connected to a pointer for moving the latter over a scale calibrated in Brinell hardness numbers or some equivalent hardness indicating indicia.

In the interests of accuracy it is preferred to position the stem so that the outer end registers with the bottom of the depression at the center of the latter and it is a further object of this invention to provide a locating element for accomplishing the above result. The locating element is supported on the indicator case or frame for sliding movement relative to the stem and is provided with a generally spherically shaped head at the outer end. The head projects through the rest plate in concentric relation to the stem and is engageable with the walls of the depression to accurately locate the stem.

It is still another object of this invention to provide a rest plate having a central opening through which the outer end of the stem projects and having slots distributed around the opening in concentric relation to the latter. The slots respectively receive fingers projecting outwardly from the locating element and the end surfaces of the fingers cooperate to form the generally spherically shaped head on the locating element.

The foregoing as well as other objects will be made more apparent as this description proceeds especially when considered in connection with the accompanying drawing wherein:

Figure 1 is a front elevational view of an indicator constructed in accordance with this invention;

Figure 2 is a sectional view of the indicator shown in Figure 1;

Figure 3 is an end elevational view of the indicator shown in Figure 1;

Figure 4 is an exaggerated fragmentary sectional view showing the indicator in operative position with respect to a specimen or work piece; and Figure 5 is an end elevational view of the locator embodied in the indicator shown in Figure 1.

The indicator forming the subject matter of this invention may be used to advantage in measuring the depth of an indentation or depression and is of a size to enable the same to be conveniently grasped in one hand of the user. More particularly, the indicator selected herein for the purpose of illustration is designed for use in determining the hardness characteristics of work pieces or specimens and renders it possible to read the hardness number directly without consulting conversion tables or making any calculations.

With the above in view, reference is now made more in detail to the drawing wherein the numeral 10 designates an indicator comprising a casing 11 having a removable wall 12 at the back and having a circular dial 13 at the front. An enlargement 14 projects from one side of the casing and a circular recess 15 is formed in the enlargement. The base 16 of the recess is formed with an opening 17 at its center and this opening communicates with the interior of the casing 11. An operating stem 18 is supported in the opening 17 for sliding movement and the outer end portion of the stem projects axially through the recess 15. The extreme outer end 19 of the stem 18 is reduced substantially in diameter forming a surrounding shoulder 18a and is engageable with the work piece or specimen to be tested in a manner to be presently described.

A shouldered bushing 20 is pressed or otherwise secured within the recess 15 and a circular rest plate 21 is removably secured to the bushing 20 by studs 22. The outer side of the plate is ground or otherwise fashioned to provide a flat bearing surface 23 and an opening 24 is formed in the plate 21 at the center of the latter. The opening 24 slidably receives the reduced outer end 19 of the stem 18 and the length of the end 19 is determined to project for some distance beyond the bearing surface 23 on the plate 21 when the shoulder 18a of the stem is in contact with said plate.

The outer end 19 of the stem 18 is accurately located with respect to the work or specimen being tested by a locator 25 which is tubular in cross section and is slidably supported in the bushing 20. The bore in the locator 25 is of sufficient diameter to freely receive the stem 18 and a head 26 is formed at the outer end of the locator. A pair of slots 27 extending at right angles to one another are formed in the head 26. The slots 27 intersect at the axis of the locator and divide the head 26 into four fingers 28. The fingers 28 are symmetrically located with respect to the outer end 19 of the stem 18 and respectively project outwardly through correspondingly shaped slots 29 formed in the plate 21. As shown in Figure 3 of the drawing, the radially inner ends of the slots 29 actually intersect the central opening 24 in the plate 21 so that the spherically shaped outer surfaces of the fingers 28 engage the work or specimen immediately adjacent the outer end 19 of the stem 18 and cooperate with one another to accurately locate the stem.

The locator 25 is yieldably urged in an outward direction by a coil spring 30 surrounding the stem 18 with the inner end abutting the base 16 of the recess 15 and with the outer end engaging the locator. The extent of outward movement of the locator 25 by the spring 30 is limted by engagement of the base portions of the slots 29 with the adjacent portions of the plate 21 and the arrangement is such that the outer extremities of the fingers 28 are normally spaced slightly beyond the outer end 19 of the stem 18. Thus the outer end 19 of the stem 18 is accurately positioned with respect to the work piece or specimen by the locator before the stem is actually engaged with the specimen or work piece.

In Figure 4 of the drawings, a work piece or specimen in the form of a steel plate 31 is shown. The plate 31 has an indentation or depression 32 in the top face. For the purpose of illustration let it be assumed that the depression 32 is formed by pressing a hardened steel ball 10 millimeters in diameter against the plate 31 with a force resulting from applying a load of 3,000 kilograms on the ball. This procdure is followed when employing the Brinell process in testing hardness and is well known to those skilled in this art. The depth of the depression 32 formed by the hardened steel ball depends on the hardness of the material or plate 31 and it is the purpose of the indicator 10 to accurately measure the depth of the depression. This may be readily accomplished by placing the indicator 10 on the plate 31 in the position shown in Figure 4 of the drawings wherein the head or outer end of the locator 25 registers with the depression 32 and positions the outer end 19 of the stem 18 at the center of the depression. The indicator is then moved toward the plate 31 until the bearing surface 23 on the plate 21 seats against the surface on the plate 31 surrounding the depression 32. As a result the locator 25 is in effect moved inwardly relative to the stem 18 to enable the outer end 19 of the stem 18 to engage the base of the depression 32 at its center. Thus the stem 18 also moves inwardly and the extent of inward movement of the stem depends on the depth of the depresison 32.

In forming the depression 32 in the plate 31 with the hardened steel ball a portion of the material surrounding the depression 32 is frequently upset and forms a rim 33 around the depression 32. It has been found that the height of this rim should be added to the depth of the depression 32 in order to secure accurate readings of the hardness of the material. This is accomplished with the indicator 10 previously described because the bearing surface 23 on the rest plate 21 is arranged to actually seat against the rim 33 when the indicator 10 is in its operative position with respect to the plate or specimen 31.

Inward movement of the stem 18 is translated to a rotative movement of a pointer 34 positioned at the front side of the dial 13 and secured to the outer end of a shaft 35. The shaft 35 is suitably journaled on the dial at the center of the latter and the inner end of the shaft extends into the casing 11. The connection between the shaft 35 and stem is not shown in detail herein since it may be identical to the connection employed in orthodox dial type indicators. Briefly, a pinion 36 is secured to the shaft 35 and meshes with a relatively large gear 37. The gear 37 is secured to a shaft 38 suitably journaled in the casing 11 and having a rack gear 39 secured thereto. The gear 39 meshes with rack teeth formed on the stem 18 intermediate the ends thereof. Thus movement of the stem in opposite directions imparts a rotative movement to the pointer 34 in opposite directions. The outermost position of the stem 18 is determined by a stop 41 adjustably mounted on the stem 18 and normally urged into engagement with the adjacent side of the casing 11 by a spring 42. The location of the stop 41 is such that in the free position of the parts the outer end 19 of the stem is spaced a slight distance inwardly from the outer ends of the locator fingers 28. As stated above this arrangement enables accurately locating the indicator 10 relative to the depression 32 before actually measuring the depth of the latter.

The pointer 34 sweeps along a circular scale 40 printed, etched, engraved or otherwise applied to the outer face of the dial 13 and this scale is calibrated to denote hardness characteristics. In Figure 1 of the drawing the scale is shown as calibrated in Brinell hardness numbers corresponding to an indenting ball of 10 millimeters in diameter and a load of 3,000 kilograms. This showing, however, is merely for the purpose of illustration as it is apparent that other types of scales may be employed. In any case it is preferred to employ a scale which enables reading directly the hardness characteristic of the material being tested. The scale has a zero position 43 and the dial 13 is rotatably adjustable to align the zero position on the scale with the pointer in the free or inoperative position of the indicator. This is accomplished by a pinion 44 engageable with teeth on the rim of the dial 13, as shown in Figure 1 of the drawing. The pinion is fixed to a shaft 45 having one end accessible for manipulation at a point exteriorly of the casing 11.

What we claim as our invention is:

1. An indicator for determining the depth of a hardness test depression in a member under test, comprising a frame having a planar datum surface for seating upon the rim of the depression and having a central recess in said surface, indicating means mounted on said frame including a stem, resilient means for yieldably projecting said stem axially outward through said recess, and an indicator operated by said stem gauging the exact distance of the outer end thereof beyond said surface, a locator surrounding said stem and resilient means for independently yieldably pressing the same axially outward from said recess to initially engage said depression and being withdrawable into said recess.

2. The construction as in claim 1 in which said locator is slotted to divide the same into a plurality of segments and said seating surface extends inward between said segments into proximity to said stem.

3. The construction as in claim 1 in which the outer end of the locator forms a segmental spherical surface for engaging the spherical wall of the depression.

HARRY W. DIETERT.
JOHN A. SCHUCH.
RALPH E. STEINMUELLER.

REFERENCES CITED

The following references are of record in the file of this patent:

UNITED STATES PATENTS

| Number | Name | Date |
|---|---|---|
| 2,052,153 | Willis | Aug. 25, 1936 |
| 2,404,751 | Schmitt | July 23, 1946 |

FOREIGN PATENTS

| Number | Country | Date |
|---|---|---|
| 239,409 | Switzerland | Jan. 16, 1946 |